(12) United States Patent
Yang

(10) Patent No.: US 8,043,187 B2
(45) Date of Patent: Oct. 25, 2011

(54) AUTOMATIC TRANSMISSION FOR VEHICLES

(75) Inventor: Sang Suk Yang, Suwon (KR)

(73) Assignee: Hyundai Motor Company, Seoul (KR)

( * ) Notice: Subject to any disclaimer, the term of this patent is extended or adjusted under 35 U.S.C. 154(b) by 728 days.

(21) Appl. No.: 12/143,449

(22) Filed: Jun. 20, 2008

(65) Prior Publication Data
US 2009/0156349 A1    Jun. 18, 2009

(30) Foreign Application Priority Data
Dec. 17, 2007  (KR) .................. 10-2007-0132082

(51) Int. Cl.
*F16H 37/02* (2006.01)
*F16H 3/08* (2006.01)
(52) U.S. Cl. ................... 475/218; 475/215; 74/330
(58) Field of Classification Search .......... 475/210–219; 74/330
See application file for complete search history.

(56) References Cited

U.S. PATENT DOCUMENTS

| | | | |
|---|---|---|---|
| 2,757,557 A | | 8/1956 | Hoffman |
| 6,893,373 B2* | | 5/2005 | Kawamoto et al. ........... 475/302 |
| 7,311,630 B2* | | 12/2007 | Borgerson ................... 475/215 |
| 7,695,390 B2* | | 4/2010 | Phillips ......................... 475/218 |
| 7,833,120 B2* | | 11/2010 | Yang .............................. 475/209 |
| 2007/0243968 A1* | | 10/2007 | Ogata ........................... 475/214 |

FOREIGN PATENT DOCUMENTS

FR    2846917 A1 *    5/2004

OTHER PUBLICATIONS

Machine translation of FR2846917 on Apr. 1, 2011.*

* cited by examiner

*Primary Examiner* — Tisha Lewis
(74) *Attorney, Agent, or Firm* — Morgan, Lewis & Bockius LLP

(57) ABSTRACT

An automatic transmission for vehicles, whose weight, length, and manufacturing cost are reduced as a consequence of simplifying a structure thereof by removing a torque converter. The automatic transmission for vehicles may include a first shift portion outputting three intermediate rotational speeds of a same rotational speed as an input rotational speed, an increased rotational speed, and a reverse rotational speed by using torque received through first and second variable input pathways, and a second shift portion including first, second, third, and fourth gears that respectively achieve first, second, third, and fourth gear ratios, changing each intermediate rotational speed received from the first shift portion into four final rotational speeds, and outputting the same.

9 Claims, 3 Drawing Sheets

FIG.3

|  | C1 | C2 | C3 | C4 | B1 | B2 | SYN1 | SYN2 |
|---|---|---|---|---|---|---|---|---|
| Neutral | ● | ● |  |  |  |  |  |  |
| F1 | ● | ● | ● |  |  |  | SL11 |  |
| F2 | ● | ● |  | ● |  |  | SL12 |  |
| F3 | ● | ● | ● |  |  |  |  | SL21 |
| F4 | ● | ● |  | ● |  |  |  | SL22 |
| F5 | ● |  | ● |  | ● |  | SL11 |  |
| F6 | ● |  |  | ● | ● |  | SL12 |  |
| F7 | ● |  | ● |  | ● |  |  | SL21 |
| F8 | ● |  |  | ● | ● |  |  | SL22 |
| R1 |  | ● | ● |  |  | ● | SL11 |  |
| R2 |  | ● |  | ● |  | ● | SL12 |  |
| R3 |  | ● | ● |  |  | ● |  | SL21 |
| R4 |  | ● |  | ● |  | ● |  | SL22 |

AUTOMATIC TRANSMISSION FOR VEHICLES

CROSS-REFERENCE TO RELATED APPLICATION

This application claims priority to and the benefit of Korean Patent Application No. 10-2007-0132082 filed in the Korean Intellectual Property Office on Dec. 17, 2007, the entire contents of which are incorporated herein by reference.

BACKGROUND OF THE INVENTION (a) Field of the Invention

The present invention relates to an automatic transmission for vehicles that achieves eight forward speeds and four reverse speeds. More particularly, the present invention relates to an automatic transmission for vehicles, whose weight, length, and manufacturing cost are reduced as a consequence of simplifying a structure thereof by removing a torque converter.

(b) Description of the Related Art

A transmission of a vehicle is disposed between an engine and a drive shaft. The transmission converts engine torque into torque and speed suitable for a running state of the vehicle, and transmits the torque and speed to a driving wheel.

That is, the transmission achieves a neutral state so as to enable the engine to be started, forward speeds by suitably changing the driving torque of the engine so as to enable the vehicle to move forwardly, and reverse speeds by suitably changing the driving torque of the engine so as to enable the vehicle to move backwardly.

Transmissions for vehicles are divided largely into a manual transmission where a driver directly performs a shifting action, and an automatic transmission where a detecting means disposed at a preferable position in the vehicle detects the driving state of the vehicle and a transmission control unit (TCU) automatically performs the shifting action based on the driving state. The present invention relates to an automatic transmission.

Generally, an automatic transmission or vehicles includes a torque converter, a power train connected to the torque converter and achieving a plurality of gear ratios, and a hydraulic control system selectively operating operation members of the power train according to the driving state of the vehicle.

The automatic transmission also includes a compound planetary gear set formed by combining at least two simple planetary gear sets to achieve the required multiple speeds. The power train includes a plurality of frictional members, and the hydraulic control system selectively operates the frictional members of the power train according to the driving condition.

A variety of such power trains and hydraulic control systems have been developed by vehicle manufacturers according to their own schemes. □

Currently, four-speed and five-speed automatic transmissions are most often found on the market. However, six-speed automatic transmissions have also been realized for enhancement of performance of power transmission and for enhanced fuel mileage of a vehicle.

In spite of excellent merits, the automatic transmission has disadvantages in efficiency. Currently, automatic transmissions that have the excellent efficiency of a manual transmission as well as the convenience of an automatic transmission are under investigation through using a plurality of frictional members (i.e., clutches and brakes) and shift automation means mounted to a conventional manual transmission.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide an automatic transmission for vehicles having advantages of the excellent efficiency of a manual transmission as well as the convenience of an automatic transmission through using a plurality of frictional members and shift automation means mounted to a conventional manual transmission and simple planetary gear sets.

An automatic transmission for vehicles according to an exemplary embodiment of the present invention may include a first shift portion outputting three intermediate rotational speeds of a same rotational speed as an input rotational speed, an increased rotational speed, and a reverse rotational speed by using torque received through first and second variable input pathways, and a second shift portion including first, second, third, and fourth gears that respectively achieve first, second, third, and fourth gear ratios, changing each intermediate rotational speed received from the first shift portion into four final rotational speeds, and outputting the same.

The first shift portion may include first, second, and third operating members, wherein the first operating member selectively receives the torque through the first variable input pathway or is selectively stopped, the second operating member selectively receives the torque through the second variable input pathway or is selectively stopped, and the third operating member is always operated as an output member.

The first shift portion may be a planetary gear set provided with a sun gear, a planet carrier, and a ring gear as operating members thereof, wherein the planet carrier is operated as the first operating member, the sun gear is operated as the second operating member, and the ring gear is operated as the third operating member.

The first shift portion may further include a first clutch selectively transmitting the torque to the first operating member through the first variable input pathway, a second clutch transmitting the torque to the second operating member through the second variable input pathway, a first brake selectively stopping the second operating member, and a second brake selectively stopping the first operating member.

The intermediate rotational speeds of the first shift portion may be selectively transmitted to the second shift portion through third and fourth variable input pathways.

The second shift portion may include a first input shaft receiving the intermediate rotational speeds of the first shift portion through the third variable input pathway, a second input shaft penetrating the first input shaft and receiving the intermediate rotational speeds of the first shift portion through the fourth variable input pathway, a first intermediate shaft disposed in parallel with the first and second input shafts and selectively connected to the first and second input shafts so as to achieve the first and second gear ratios, and a second intermediate shaft disposed in parallel with the first and second input shafts and selectively connected to the first and second input shafts so as to achieve the third and fourth gear ratios.

A first synchronizer provided with the first and second gears may be disposed on the first intermediate shaft, and a second synchronizer provided with the third and fourth gears may be disposed on the second intermediate shaft.

The first input shaft may be provided with a first input gear integrally formed thereto and the second input shaft may be provided with a second input gear integrally formed thereto, wherein the first input gear is engaged with the first and third gears, and the second input gear is engaged with the second and fourth gears.

The first synchronizer may include a first sleeve selectively connecting the first gear with the first intermediate shaft, and a second sleeve selectively connecting the second gear with the first intermediate shaft.

The second synchronizer may include a third sleeve selectively connecting the third gear with the second intermediate shaft, and a fourth sleeve selectively connecting the fourth gear with the second intermediate shaft.

The second shift portion may further include a first transfer drive gear integrally formed with the first intermediate shaft, a second transfer drive gear integrally formed with the second intermediate shaft, and a transfer driven gear engaged with the first and second transfer drive gears and outputting a final rotational speed.

The automatic transmission may further include a third clutch selectively transmitting the intermediate rotational speed of the first shift portion to the second shift portion through the third variable input pathway, and a fourth clutch selectively transmitting the intermediate rotational speed of the first shift portion to the second shift portion through the fourth variable input pathway.

The first, second, third, and fourth clutches and the first and second brakes may be disposed at an exterior portion of the first shift portion.

BRIEF DESCRIPTION OF THE DRAWINGS

FIG. 3 is an operational chart for an automatic transmission for vehicles according to an exemplary embodiment of the present invention.

DETAILED DESCRIPTION OF THE EMBODIMENTS

Hereinafter, an exemplary embodiment of the present invention will be described in detail with reference to the accompanying drawings.

Figure 1:
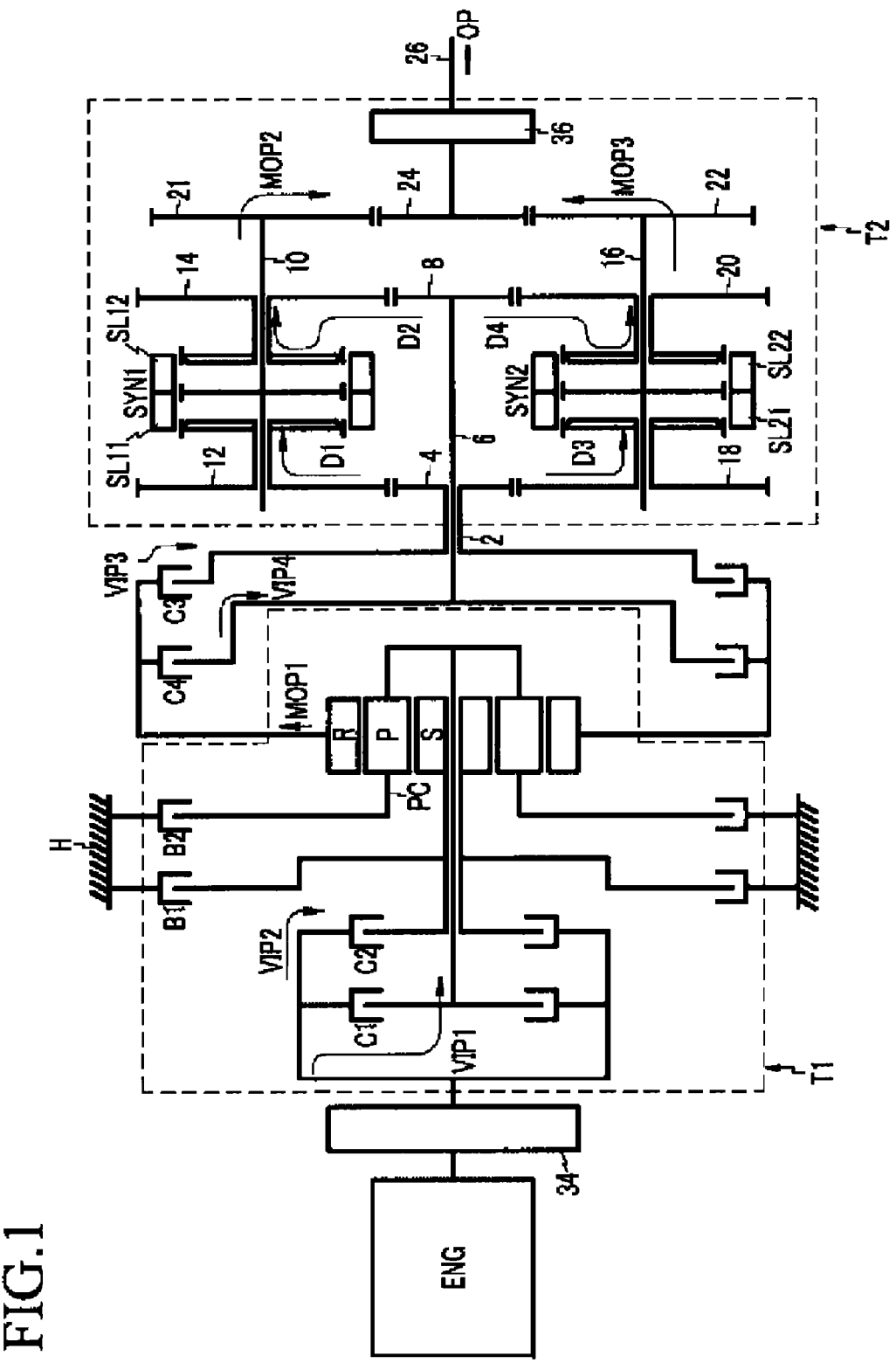
FIG. 1 is a schematic diagram of an automatic transmission for vehicles according to an exemplary embodiment of the present invention.

FIG. 1 is a schematic diagram of an automatic transmission for vehicles according to an exemplary embodiment of the present invention.

An automatic transmission for vehicles according to an exemplary embodiment of the present invention includes a first shift portion T1 outputting intermediate rotational speeds of two forward speeds and one reverse speed, and a second shift portion T2 changing each intermediate rotational speed received from the first shift portion T1 into four final rotational speeds and outputting the same.

The first shift portion T1 is a single pinion planetary gear set, and includes a sun gear S disposed at a middle portion thereof, a planet carrier PC supporting a plurality of pinions P that are engaged with the sun gear S, and a ring gear R engaged with the plurality of pinions P.

The sun gear S and the planet carrier PC are selectively operated as an input member and a fixed member, and the ring gear R is always operated as an output member.

Therefore, the planet carrier PC and the sun gear S are selectively connected to an engine ENG by interposing respectively first and second clutches C1 and C2 that are frictional members, and receive torque respectively through first and second variable input pathways VIP1 and VIP2.

In addition, the sun gear S and the planet carrier PC are selectively connected to a transmission housing H by respectively interposing first and second brakes B1 and B2 and operate as fixed members. The ring gear R is fixedly connected to a first intermediate output pathway MOP1.

Therefore, if the first and second clutches C1 and C2 are simultaneously operated, all operating members of the first shift portion T1 become in a lock state and a rotational speed that is the same as an input rotational speed is output through the first intermediate output pathway MOP1.

If the sun gear S is operated as the fixed member by operation of the first brake B1 in a state that the torque is input to the first shift portion Ti through the first variable input pathway VIP1 by operation of the first clutch C1, an increased rotational speed that is faster than the input rotational speed is output through the first intermediate output pathway MOP1.

If the planet carrier PC is operated as the fixed member by operation of the second brake B2 in a state that the torque is input to the first shift portion T1 through the second variable input pathway VIP2 by operation of the second clutch C2, a reverse rotational speed whose direction is opposite to that of the input rotational speed is output through the first intermediate output pathway MOP1.

The second shift portion T2 changes three intermediate rotational speeds of the first shift portion received through two variable input pathways VIP3 and VIP4 respectively into four final rotational speeds, and outputs the same through a final output pathway OP.

For this purpose, the second shift portion T2 includes a plurality of gears and synchronizers achieving a plurality of gear ratios disposed on a plurality of shafts, similar to a conventional manual transmission.

The second shift portion T2 includes first and second input shafts 2 and 6 and first and second intermediate shafts 10 and 16.

The first input shaft 2 has a hollow space, a front portion thereof is connected to the first intermediate output pathway MOP1 of the first shift portion T1 by interposing a third clutch C3 in order to selectively receive the intermediate rotational speeds of the first shift portion T1 through the third variable input pathway VIP3, and a rear portion thereof is integrally formed with a first input gear 4.

The second input shaft 6 penetrating the hollow space of the first input shaft 2 is provided with a front portion connected to the first intermediate output pathway MOP1 of the first shift portion T1 by interposing a fourth clutch C4 in order to selectively receive the intermediate rotational speeds of the first shift portion T1 through the fourth variable input pathway VIP4, and a rear portion integrally formed with a second input gear 8.

The first intermediate shaft 10 is disposed in parallel with and apart by a predetermined distance from the first and second input shafts 2 and 6. A first synchronizer SYN1 including first and second gears 12 and 14 is disposed on the first intermediate shaft 10, and a first transfer drive gear 21 is integrally formed with a rear portion of the first intermediate shaft 10. Therefore, the final rotational speeds are output through the second intermediate output pathway MOP2.

The first synchronizer SYN1 includes first and second sleeves SL11 and SL12. The first intermediate shaft 10 is connected to the first gear 12 in a case that the first sleeve SL11 is operated, and is connected to the second gear 14 in a case that the second sleeve SL12 is operated.

Since the first gear 12 is engaged with the first input gear 4 and the second gear 14 is engaged with the second input gear 8, the first input gear 4, the first gear 12, and the first sleeve SL11 form a first shift pathway D1, and the second input gear 8, the second gear 14, and the second sleeve SL12 form a second shift pathway D2.

The second intermediate shaft 16 is disposed in parallel with and apart by a predetermined distance from the first and second input shafts 2 and 6. A second synchronizer SYN2 including third and fourth gears 18 and 20 is disposed on the second intermediate shaft 16, and a second transfer drive gear 22 is integrally formed with a rear portion of the second intermediate shaft 16. Therefore, the final rotational speeds are output through the third intermediate output pathway MOP3.

The second synchronizer SYN2 includes third and fourth sleeves SL21 and SL22. The second intermediate shaft 16 is connected to the third gear 18 in a case that the third sleeve SL21 is operated, and is connected to the fourth gear 20 in a case that the fourth sleeve SL22 is operated.

Since the third gear 18 is engaged with the first input gear 4 and the fourth gear 20 is engaged with the second input gear 8, the first input gear 4, the third gear 18, and the third sleeve SL21 form a third shift pathway D3, and the second input gear 8, the fourth gear 20, and the fourth sleeve SL22 form a fourth shift pathway D4.

An output shaft 26 integrally formed with a transfer driven gear 24 that is engaged with the first and second transfer drive gears 21 and 22 is connected to the final output pathway OP in order to drive a driving wheel through a differential apparatus (not shown).

Actuators (not shown) driving respective sleeves SL11, SL12, SL21, and SL22 used in the first and second synchronizers SYN1 and SYN2 are driven by a transmission control unit.

The actuators may be driven by using an electric motor or be driven by receiving hydraulic pressure from a hydraulic control system. Structures and driving methods of such actuators are well known to a person of an ordinary skill in the art, and thus, a detailed description will be omitted.

Un-described reference numerals 34 and 36 in FIG. 1 represent a hydraulic pump and a parking device, respectively.

Figure 2:
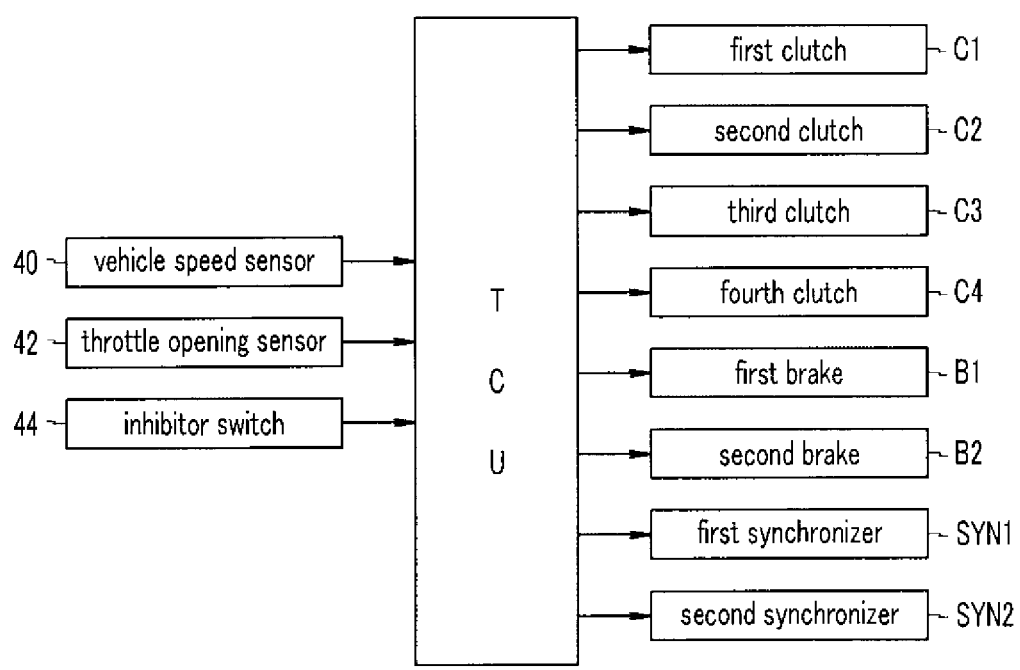
FIG. 2 is a block diagram of a system for operating an automatic transmission for vehicles according to an exemplary embodiment of the present invention.

FIG. 2 is a block diagram of a system for operating an automatic transmission for vehicles according to an exemplary embodiment of the present invention.

As shown in FIG. 2, a system for operating an automatic transmission for vehicles according to an exemplary embodiment of the present invention includes a vehicle speed sensor 40 detecting a vehicle speed, a throttle opening sensor 42 detecting a throttle opening, an inhibitor switch 44 detecting a shift range, and the transmission control unit TCU analyzing information received from respective sensors 40 and 42 and the inhibitor switch 44 and controlling the first, second, third, and fourth clutches C1, C2, C3, and C4, the first and second brakes B1 and B2, and the first and second synchronizers SYN1 and SYN2.

Meanwhile, the first, second, third, and fourth clutches C1, C2, C3, and C4 and the first and second brakes B1 and B2 may be disposed at an exterior portion of the first shift portion T1.

If the frictional members are disposed at the exterior portion of the first shift portion T1, length of the transmission may be reduced and frictional heat generated at the frictional members is efficiently emitted to the exterior of the transmission housing H.

In addition, operational pressure of the frictional members provided with a plurality of wet friction disks includes supply pressure and centrifugal pressure. If radii of the frictional members become increased, the centrifugal pressure also becomes increased. Therefore, the supply pressure supplied to the frictional members may be reduced and accordingly capacity of the hydraulic pump may be also reduced.

FIG. 3 is an operational chart for an automatic transmission for vehicles according to an exemplary embodiment of the present invention.

The first, second, and third clutches C1, C2, and C3 and the first sleeve SL11 of the first synchronizer SYN1 are operated at a first forward speed F1, the first, second, and fourth clutches C1, C2, and C4 and the second sleeve SL12 of the first synchronizer SYN1 are operated at a second forward speed F2, the first, second, and third clutches C1, C2, and C3 and the third sleeve SL21 of the second synchronizer SYN2 are operated at a third forward speed F3, and the first, second, and fourth clutches C1, C2, and C4 and the fourth sleeve SL22 of the second synchronizer SYN2 are operated at a fourth forward speed F4.

In addition, the first and third clutches C1 and C3, the first brake B1, and the first sleeve SL11 of the first synchronizer SYN1 are operated at a fifth forward speed F5, the first and fourth clutches C1 and C4, the first brake B1, and the second sleeve SL12 of the first synchronizer SYN1 are operated at a sixth forward speed F6, the first and third clutches C1 and C3, the first brake B1, and the third sleeve SL21 of the second synchronizer SYN2 are operated at a seventh forward speed F7, and the first and fourth clutches C1 and C4, the first brake B1, and the fourth sleeve SL22 of the second synchronizer SYN2 are operated at an eighth forward speed F8.

Further, the second and third clutches C2 and C3, the second brake B2, and the first sleeve SL11 of the first synchronizer SYN1 are operated at a first reverse speed R1, the second and fourth clutches C2 and C4, the second brake B2, and the second sleeve SL12 of the first synchronizer SYN1 are operated at a second reverse speed R2, the second and third clutches C2 and C3, the second brake B2, and the third sleeve SL21 of the second synchronizer SYN2 are operated at a third reverse speed R3, and the second and fourth clutches C2 and C4, the second brake B2, and the fourth sleeve SL22 of the second synchronizer SYN2 are operated at a fourth reverse speed R4.

Shifting processes in an automatic transmission for vehicles according to an exemplary embodiment of the present invention will now be described in detail.

First Forward Speed

At the first forward speed F1, the transmission control unit TCU operates the first, second, and third clutches C1, C2, and C3, and the first sleeve SL11 of the first synchronizer SYN1.

In this case, since the torque is input to the first shift portion T1 through the first and second variable input pathways VIP1 and VIP2 by operations of the first and second clutches C1 and C2, all operating members of the first shift portion T1 become in the lock state and a rotational speed that is the same as the input rotational speed is output through the first intermediate output pathway MOP1.

In addition, the same rotational speed of the first intermediate output pathway MOP1 is input to the second shift portion T2 through the third variable input pathway VIP3 by operation of the third clutch C3. The first sleeve SL11 of the first synchronizer SYN1 connects the third variable input pathway VIP3 to the first shift pathway D1, and the first forward speed F1 is achieved.

The first forward speed F1 is output through the second intermediate output pathway MOP2 and the final output pathway OP.

Second Forward Speed

If the vehicle speed increases in a state of the first forward speed F1, the transmission control unit TCU releases the third clutch C3 and the first sleeve SL11 of the first synchronizer SYN1 and operates the fourth clutch C4 and the second sleeve SL12 of the first synchronizer SYN1.

In this case, since the torque is input to the first shift portion T1 through the first and second variable input pathways VIP1 and VIP2 by operations of the first and second clutches C1 and C2, all operating members of the first shift portion T1 become in the lock state and a rotational speed that is the same as the input rotational speed is output through the first intermediate output pathway MOP1.

In addition, the same rotational speed of the first intermediate output pathway MOP1 is input to the second shift portion T2 through the fourth variable input pathway VIP4 by operation of the fourth clutch C4. The second sleeve SL12 of the first synchronizer SYN1 connects the fourth variable input pathway VIP4 to the second shift pathway D2, and the second forward speed F2 is achieved.

The second forward speed F2 is output through the second intermediate output pathway MOP2 and the final output pathway OP.

Third Forward Speed

If the vehicle speed increases in a state of the second forward speed F2, the transmission control unit TCU releases the fourth clutch C4 and the second sleeve SL12 of the first synchronizer SYN1 and operates the third clutch C3 and the third sleeve SL21 of the second synchronizer SYN2.

In this case, since the torque is input to the first shift portion T1 through the first and second variable input pathways VIP1 and VIP2 by operations of the first and second clutches C1 and C2, all operating members of the first shift portion T1 becomes the lock state and a rotational speed that is the same as the input rotational speed is output through the first intermediate output pathway MOP1.

In addition, the same rotational speed of the first intermediate output pathway MOP1 is input to the second shift portion T2 through the third variable input pathway VIP3 by the operation of the third clutch C3. The third sleeve SL21 of the second synchronizer SYN2 connects the third variable input pathway VIP3 to the third shift pathway D3, and the third forward speed F3 is achieved.

The third forward speed F3 is output through the third intermediate output pathway MOP3 and the final output pathway OP.

Fourth Forward Speed

If the vehicle speed increases in a state of the third forward speed F3, the transmission control unit TCU releases the third clutch C3 and the third sleeve SL21 of the second synchronizer SYN2 and operates the fourth clutch C4 and the fourth sleeve SL22 of the second synchronizer SYN2.

In this case, since the torque is input to the First shift portion T1 through the first and second variable input pathways VIP1 and VIP2 by operations of the first and second clutches C1 and C2, all operating members of the first shift portion T1 become in the lock state and a rotational speed that is the same as the input rotational speed is output through the first intermediate output pathway MOP1.

In addition, the same rotational speed of the first intermediate output pathway MOP1 is input to the second shift portion T2 through the fourth variable input pathway VIP4 by the operation of the fourth clutch C4. The fourth sleeve SL22 of the second synchronizer SYN2 connects the fourth variable input pathway VIP4 to the fourth shift pathway D4, and the fourth forward speed F4 is achieved.

The fourth forward speed F4 is output through the third intermediate output pathway MOP3 and the final output pathway OP.

Fifth Forward Speed

If the vehicle speed increases in a state of the fourth forward speed F4, the transmission control unit TCU releases the second and fourth clutches C2 and C4 and the fourth sleeve SL22 of the second synchronizer SYN2 and operates the third clutch C3, the first brake B1, and the first sleeve SL11 of the first synchronizer SYN1.

In this case, the sun gear S is operated as the fixed member by the operation of the first brake B1 in a state that the torque is input to the first shift portion T1 through the first variable input pathway VIP1 by the operation of the first clutch C1. Therefore, the increased rotational speed that is faster than the input rotational speed is output through the first intermediate output pathway MOP1.

In addition, the increased rotational speed of the first intermediate output pathway MOP1 is input to the second shift portion T2 through the third variable input pathway VIP3 by the operation of the third clutch C3. The first sleeve SL11 of the first synchronizer SYN1 connects the third variable input pathway VIP3 to the first shift pathway D1, and the fifth forward speed F5 is achieved.

The fifth forward speed F5 is output through the second intermediate output pathway MOP2 and the final output pathway OP.

Sixth Forward Speed

If the vehicle speed increases in a state of the fifth forward speed F5, the transmission control unit TCU releases the third clutch C3 and the first sleeve SL11 of the first synchronizer SYN1 and operates the fourth clutch C4 and the second sleeve SL12 of the first synchronizer SYN1.

In this case, the sun gear S is operated as the fixed member by the operation of the first brake B1 in a state that the torque is input to the first shift portion T1 through the first variable input pathway VIP1 by the operation of the first clutch C1. Therefore, the increased rotational speed that is faster than the input rotational speed is output through the first intermediate output pathway MOP1.

In addition, the increased rotational speed of the first intermediate output pathway MOP1 is input to the second shift portion T2 through the fourth variable input pathway VIP4 by the operation of the fourth clutch C4. The second sleeve SL12 of the first synchronizer SYN1 connects the fourth variable input pathway VIP4 to the second shift pathway D2, and the sixth forward speed F6 is achieved.

The sixth forward speed F6 is output through the second intermediate output pathway MOP2 and the final output pathway OP.

Seventh Forward Speed

If the vehicle speed increases in a state of the sixth forward speed F6, the transmission control unit TCU releases the fourth clutch C4 and the second sleeve SL12 of the first synchronizer SYN1 and operates the third clutch C3 and the third sleeve SL21 of the second synchronizer SYN2.

In this case, the sun gear S is operated as the fixed member by the operation of the first brake B1 in a state that the torque is input to the first shift portion T1 through the first variable input pathway VIP1 by the operation of the first clutch C1. Therefore, the increased rotational speed that is faster than the input rotational speed is output through the first intermediate output pathway MOP1.

In addition, the increased rotational speed of the first intermediate output pathway MOP1 is input to the second shift portion T2 through the third variable input pathway VIP3 by the operation of the third clutch C3. The third sleeve SL21 of the second synchronizer SYN2 connects the third variable input pathway VIP3 to the third shift pathway D3, and the seventh forward speed F7 is achieved.

The seventh forward speed F7 is output through the third intermediate output pathway MOP3 and the final output pathway OP.

Eighth Forward Speed

If the vehicle speed increases in a state of the seventh forward speed F7, the transmission control unit TCU releases the third clutch C3 and the third sleeve SL21 of the second synchronizer SYN2 and operates the fourth clutch C4 and the fourth sleeve SL22 of the second synchronizer SYN2.

In this case, the sun gear S is operated as the fixed member by the operation of the first brake B1 in a state that the torque is input to the first shift portion T1 through the first variable input pathway VIP1 by the operation of the first clutch C1. Therefore, the increased rotational speed that is faster than the input rotational speed is output through the first intermediate output pathway MOP1.

In addition, the increased rotational speed of the first intermediate output pathway MOP1 is input to the second shift portion T2 through the fourth variable input pathway VIP4 by the operation of the fourth clutch C4. The fourth sleeve SL22 of the second synchronizer SYN2 connects the fourth variable input pathway VIP4 to the fourth shift pathway D4, and the eighth forward speed F8 is achieved.

The eighth forward speed F8 is output through the third intermediate output pathway MOP3 and the final output pathway OP.

First Reverse Speed

At the first reverse speed RI, the transmission control unit TCU operates the second and third clutches C2 and C3, the second brake B2, and the first sleeve SL11 of the first synchronizer SYN1.

In this case, the planet carrier PC is operated as the fixed member by the operation of the second brake B2 in a state that the torque is input to the first shift portion T1 through the second variable input pathway VIP2 by the operation of the second clutch C2. Therefore, the reverse rotational speed whose direction is opposite to that of the input rotational speed is output through the first intermediate output pathway MOP1.

In addition, the reverse rotational speed of the first intermediate output pathway MOP1 is input to the second shift portion T2 through the third variable input pathway VIP3 by the operation of the third clutch C3. The first sleeve SL11 of the first synchronizer SYN1 connects the third variable input pathway VIP3 to the first shift pathway D1, and the first reverse speed R1 is achieved.

The first reverse speed R1 is output through the second intermediate output pathway MOP2 and the final output pathway OP.

Second Reverse Speed

If the vehicle speed increases in a state of the first reverse speed R1, the transmission control unit TCU releases the third clutch C3 and the first sleeve SL11 of the first synchronizer SYN1 and operates the fourth clutch C4 and the second sleeve SL12 of the first synchronizer SYN1.

In this case, the planet carrier PC is operated as the fixed member by the operation of the second brake B2 in a state that the torque is input to the first shift portion T1 through the second variable input pathway VIP2 by the operation of the second clutch C2. Therefore, the reverse rotational speed whose direction is opposite to that of the input rotational speed is output through the first intermediate output pathway MOP1.

In addition, the reverse rotational speed of the first intermediate output pathway MOP1 is input to the second shift portion T2 through the fourth variable input pathway VIP4 by the operation of the fourth clutch C4. The second sleeve SL12 of the first synchronizer SYN1 connects the fourth variable input pathway VIP4 to the second shift pathway D2, and the second reverse speed R2 is achieved.

The second reverse speed R2 is output through the second intermediate output pathway MOP2 and the final output pathway OP.

Third Reverse Speed

If the vehicle speed increases in a state of the second reverse speed R2, the transmission control unit TCU releases the fourth clutch C4 and the second sleeve SL12 of the first synchronizer SYN1 and operates the third clutch C3 and the third sleeve SL21 of the second synchronizer SYN2.

In this case, the planet carrier PC is operated as the fixed member by the operation of the second brake B2 in a state that the torque is input to the first shift portion T1 through the second variable input pathway VIP2 by the operation of the second clutch C2. Therefore, the reverse rotational speed whose direction is opposite to that of the input rotational speed is output through the first intermediate output pathway MOP1.

In addition, the reverse rotational speed of the first intermediate output pathway MOP1 is input to the second shift portion T2 through the third variable input pathway VIP3 by the operation of the third clutch C3. The third sleeve SL21 of the second synchronizer SYN2 connects the third variable input pathway VIP3 to the third shift pathway D3, and the third reverse speed R3 is achieved.

The third reverse speed R3 is output through the third intermediate output pathway MOP3 and the final output pathway OP.

Fourth Reverse Speed

If the vehicle speed increases in a state of the third reverse speed R3, the transmission control unit TCU releases the third clutch C3 and the third sleeve SL21 of the second synchronizer SYN2 and operates the fourth clutch C4 and the fourth sleeve SL22 of the second synchronizer SYN2.

In this case, the planet carrier PC is operated as the fixed member by the operation of the second brake B2 in a state that the torque is input to the first shift portion T1 through the second variable input pathway VIP2 by the operation of the second clutch C2. Therefore, the reverse rotational speed whose direction is opposite to that of the input rotational speed is output through the first intermediate output pathway MOP1.

In addition, the reverse rotational speed of the first intermediate output pathway MOP1 is input to the second shift portion T2 through the fourth variable input pathway VIP4 by the operation of the fourth clutch C4. The fourth sleeve SL22 of the second synchronizer SYN2 connects the fourth variable input pathway VIP4 to the fourth shift pathway D4, and the fourth reverse speed R4 is achieved.

The fourth reverse speed R4 is output through the third intermediate output pathway MOP3 and the final output pathway OP.

Compared with a conventional automatic transmission, structure may be simplified by removal of a torque converter, weight and manufacturing cost may be reduced, and, particularly, fuel mileage may improve because of enhancement of power delivery efficiency according to the present invention.

Since all frictional members are disposed at the exterior portion of the first shift portion, length of the transmission may be shortened. Thus, the transmission can be mounted in an FF-vehicle. Since centrifugal pressure is increased, capacity of a hydraulic pump is reduced and emission of frictional heat may be enhanced.

Since the eight forward speeds and four reverse speeds can be achieved by means of a simple structure, the transmission may be applied to passenger vehicles and diesel vehicles of high-load and high-capacity.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An automatic transmission for vehicles, comprising:
    a first shift portion outputting three intermediate rotational speeds of a same rotational speed as an input rotational speed, an increased rotational speed, and a reverse rotational speed by using torque received through first and second variable input pathways; and
    a second shift portion comprising first, second, third, and fourth gears that respectively achieve first, second, third, and fourth gear ratios, changing each intermediate rotational speed received from the first shift portion into four final rotational speeds, and outputting the same;
    wherein the first shift portion comprises first, second, and third operating members; and
    wherein the first operating member selectively receives the torque through the first variable input pathway or is selectively stopped;
    the second operating member selectively receives the torque through the second variable input pathway or is selectively stopped; and
    the third operating member is always operated as an output member;
    wherein the first shift portion is a planetary gear set provided with a sun gear, a planet carrier, and a ring gear as operating members thereof, and
    wherein the planet carrier is operated as the first operating member, the sun gear is operated as the second operating member, and the ring gear is operated as the third operating member.

2. The automatic transmission for vehicles of claim 1, wherein the first shift portion further comprises:
    a first clutch selectively transmitting the torque to the first operating member through the first variable input pathway;
    a second clutch transmitting the torque to the second operating member through the second variable input pathway;
    a first brake selectively stopping the second operating member; and
    a second brake selectively stopping the first operating member.

3. An automatic transmission for vehicles, comprising:
    a first shift portion outputting three intermediate rotational speeds of a same rotational speed as an input rotational speed, an increased rotational speed, and a reverse rotational speed by using torque received through first and second variable input pathways; and
    a second shift portion comprising first, second, third, and fourth gears that respectively achieve first, second, third, and fourth gear ratios, changing each intermediate rotational speed received from the first shift portion into four final rotational speeds, and outputting the same;
    wherein the intermediate rotational speeds of the first shift portion are selectively transmitted to the second shift portion through third and fourth variable input pathways:
    wherein the second shift portion comprises:
        a first input shaft receiving the intermediate rotational speeds of the first shift portion through the third variable input pathway;
        a second input shaft penetrating the first input shaft, and receiving the intermediate rotational speeds of the first shift portion through the fourth variable input pathway;
        a first intermediate shaft disposed in parallel with the first and second input shafts, and selectively connected to the first and second input shafts so as to achieve the first and second gear ratios; and
        a second intermediate shaft disposed in parallel with the first and second input shafts, and selectively connected to the first and second input shafts so as to achieve the third and fourth gear ratios.

4. The automatic transmission for vehicles of claim 3, wherein a first synchronizer provided with the first and second gears is disposed on the first intermediate shaft, and a second synchronizer provided with the third and fourth gears is disposed on the second intermediate shaft.

5. The automatic transmission for vehicles of claim 4, wherein the first input shaft is provided with a first input gear integrally formed thereto and the second input shaft is provided with a second input gear integrally formed thereto, and
    wherein the first input gear is engaged with the first and third gears, and the second input gear is engaged with the second and fourth gears.

6. The automatic transmission for vehicles of claim 5, wherein the first synchronizer comprises:
    a first sleeve selectively connecting the first gear with the first intermediate shaft; and
    a second sleeve selectively connecting the second gear with the first intermediate shaft.

7. The automatic transmission for vehicles of claim 5, wherein the second synchronizer comprises:
    a third sleeve selectively connecting the third gear with the second intermediate shaft; and
    a fourth sleeve selectively connecting the fourth gear with the second intermediate shaft.

8. The automatic transmission for vehicles of claim 3, wherein the second shift portion further comprises:
    a first transfer drive gear integrally formed with the first intermediate shaft;
    a second transfer drive gear integrally formed with the second intermediate shaft; and
    a transfer driven gear engaged with the first and second transfer drive gears and outputting a final rotational speed.

9. An automatic transmission for vehicles, comprising:
    a first shift portion outputting three intermediate rotational speeds of a same rotational speed as an input rotational speed, an increased rotational speed, and a reverse rotational speed by using torque received through first and second variable input pathways; and
    a second shift portion comprising first, second, third, and fourth gears that respectively achieve first, second, third, and fourth gear ratios, changing each intermediate rotational speed received from the first shift portion into four final rotational speeds, and outputting the same;

a third clutch selectively transmitting the intermediate rotational speed of the first shift portion to the second shift portion through the third variable input pathway; and a fourth clutch selectively transmitting the intermediate rotational speed of the first shift portion to the second shift portion through the fourth variable input pathway;

wherein the intermediate rotational speeds of the first shift portion are selectively transmitted to the second shift portion through third and fourth variable input pathways;

wherein first and second clutches, the third and fourth clutches and first and second brakes are disposed at an exterior portion of the first shift portion.

* * * * *